United States Patent
Lee (10) Patent No.: US 9,426,567 B2
(45) Date of Patent: Aug. 23, 2016

(54) ELECTRONIC DEVICE FOR MICROPHONE OPERATION

(71) Applicant: Samsung Electronics Co., Ltd., Gyeonggi-do (KR)

(72) Inventor: Jun-Tae Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 247 days.

(21) Appl. No.: 14/059,683

(22) Filed: Oct. 22, 2013

(65) Prior Publication Data

US 2014/0112502 A1  Apr. 24, 2014

(30) Foreign Application Priority Data

Oct. 22, 2012  (KR) .................. 10-2012-0117333

(51) Int. Cl.
*H04R 3/00* (2006.01)
*H04M 1/60* (2006.01)
*H04M 1/725* (2006.01)
*H04R 29/00* (2006.01)
*H04R 1/40* (2006.01)

(52) U.S. Cl.
CPC ............. *H04R 3/005* (2013.01); *H04M 1/6008* (2013.01); *H04M 1/72569* (2013.01); *H04R 29/005* (2013.01); *H04M 2250/12* (2013.01); *H04R 1/406* (2013.01); *H04R 2460/07* (2013.01); *H04R 2499/11* (2013.01)

(58) Field of Classification Search
CPC ............................. H04R 1/406; H04R 2460/07
USPC ............ 381/71.12, 91, 122, 80, 26, 110–115, 381/151, 355, 175, 375; 455/411, 569.1; 345/158
See application file for complete search history.

(56) References Cited

U.S. PATENT DOCUMENTS

| | | | | |
|---|---|---|---|---|
| 2001/0046887 A1* | 11/2001 | Yamaoka | .......... | H04W 52/0258 455/569.1 |
| 2005/0069149 A1* | 3/2005 | Takahashi | .............. | H04R 1/406 381/91 |
| 2007/0253570 A1* | 11/2007 | Fukumoto | .............. | H04R 1/406 381/71.12 |
| 2008/0174550 A1* | 7/2008 | Laurila | ................... | A63F 13/02 345/158 |
| 2009/0003620 A1* | 1/2009 | McKillop | ............... | G06F 3/165 381/80 |
| 2012/0009896 A1* | 1/2012 | Bandyopadhyay | ... | G06F 1/1643 455/411 |
| 2013/0275873 A1* | 10/2013 | Shaw | .................... | G01S 3/8006 715/716 |

FOREIGN PATENT DOCUMENTS

KR 10-2009-0090861 A 8/2009
KR 10-2010-0115783 A 10/2010

* cited by examiner

*Primary Examiner* — Md S Elahee
(74) *Attorney, Agent, or Firm* — Cha & Reiter, LLC (57) ABSTRACT

An electronic device manages a plurality of microphones comprising a first microphone unit installed in a front side of the electronic device, a second microphone unit installed in a back side of the electronic device and a third microphone unit installed at a position within the electronic device. At least one sensor installed in the electronic device senses a usage condition of the electronic device comprising a physical orientation of the electronic device relative to a plane. A processor selectively operates at least two of the first, second and third microphone units in response to the sensed usage condition of the electronic device.

19 Claims, 7 Drawing Sheets

ELECTRONIC DEVICE FOR MICROPHONE OPERATION

CLAIM OF PRIORITY

This application claims the benefit under 35 U.S.C. §119 (a) of a Korean patent application filed in the Korean Intellectual Property Office on Oct. 22, 2012 and assigned Serial No. 10-2012-0117333, the entire disclosure of which is hereby incorporated by reference.

FIELD OF THE INVENTION

The present invention concerns an electronic device (e.g. smartphone, laptop) system for managing multiple microphone devices.

BACKGROUND

Electronic devices such as mobile terminals (smart phones), electronic schedulers, personal complex terminals, TeleVisions (TVs), and laptop computers are important, widely used and frequently changed means of information transmission. These electronic devices typically employ a Graphic User Interface (GUI) environment using a touch screen and are multimedia devices based in a web environment.

Known devices employ a voice recognition function, as one method of data input, involving recognition of a user voice for performance of predetermined operations. The known devices also support entry of specific commands directly using specific key input (touch input, button input, for example). Electronic device manufacturers compete to enhance a voice recognition rate of their electronic devices that typically use at least one microphone unit for sensing a user voice. The microphone devices also support voice calls and provide a speakerphone function, in addition to the above-described voice recognition function. A microphone device receives an external voice or sound through a sound collection hole of a certain shape, which is formed in a case frame of the electronic device. Accordingly, microphone units included in the microphone device are installed in various positions of the case frame to collect external voices and/or sounds effectively. A microphone device may be installed in both a front side and back side of an electronic device where the front side microphone is the main unit and receives a voice of the user directly and the back side microphone may be used as a sub-microphone unit for attenuating peripheral noise except for an input voice.

Although microphone units installed in the front and back sides of an electronic device operate well when the electronic device is in front of a user, when the electronic device is on a floor or is positioned horizontally with respect to a floor surface voice quality deteriorates and has impaired reliability. A system according to invention principles addresses these deficiencies and related problems.

SUMMARY

A system according to invention principles employs a microphone device improving accurate voice reception irrespective of device position and orientation. A microphone device removes noise and receives a high-quality voice signal irrespective of the physical position and orientation of the electronic device relative to a surface such as a floor or table top, for example.

An electronic device manages a plurality of microphones comprising a first microphone unit installed in a front side of the electronic device, a second microphone unit installed in a back side of the electronic device and a third microphone unit installed at a position within the electronic device. At least one sensor installed in the electronic device, senses a usage condition of the electronic device comprising a physical orientation of the electronic device relative to a plane. A processor selectively operates at least two of the first, second and third microphone units in response to the sensed usage condition of the electronic device.

In a feature of the invention the plane comprises a surface, the third microphone unit is located at a lateral side of the electronic device and the processor determines a current operational state of at least one of the first, second and third microphones and selectively operates at least two of the first, second and third microphones in response to the determined current operational state. The third microphone unit is located at a boundary portion between the front side and a lateral side of the electronic device, or at a boundary portion between the back side and a lateral side of the electronic device. The at least one sensor comprises proximity sensors which are installed in the front side and the back side of the electronic device, respectively, for sensing whether the front side or the back side comes in contact with a floor surface.

In another feature of the invention, the at least one sensor comprises camera modules which are installed in the front side and the back side of the electronic device, respectively, for sensing whether the front side or the back side comes in contact with a floor surface. The at least one sensor also comprises illumination sensors, which are installed in the front side and the back side of the electronic device, respectively, for sensing whether the front side or the back side comes in contact with a floor surface. Further, the at least one sensor comprises at least one of, a gyro sensor and an acceleration sensor, which are installed in the electronic device, for sensing an angle at which the electronic device intersects the plane.

In a further feature of the invention, the processor does not operate at least one of the first and second microphone units located at a side of the electronic device which comes in contact with a floor surface in response to the at least one sensor sensing that the electronic device resides on the plane comprising a surface. In an embodiment, the plane comprises a floor surface and the processor operates at least one of the first and second microphone units and the third microphone unit when the at least one sensor senses that the electronic device is orientated at a particular angular range relative to the floor surface. The angular range is a range where the electronic device has an angle of −30 degrees to 30 degrees relative to the floor surface. The first microphone unit is located at a front upper end portion of the electronic device and the second microphone unit is located at the back side of a portion where it is overlapped with the first microphone unit or a portion adjacent to an overlapped position. The second microphone unit is located within an overlap region comprising a range of 1 cm to 5 cm from a center of the first microphone unit in the back side of the electronic device.

Another feature of the invention comprises an operation method of an electronic device having a microphone device in which first, second and third microphone units are located at front, back, and lateral sides. The operation method determines a current usage condition of the electronic device comprising a physical orientation of the electronic device relative to a surface in response to sensing by at least one sensor installed in the electronic device. The method selectively activates two of the first, second and third microphone units and inactivates the remaining microphone unit of the first, second and third microphone units, in response to the determined usage condition.

In an additional feature, the method inactivates at least one of the first, second and third microphone units, which is installed in a side of the electronic device facing a floor surface when the at least one sensor senses that the electronic device is laid on the floor surface. The at least one sensor comprises at least one of proximity sensors, illumination sensors, and camera modules, which sense that the electronic device is laid on the floor surface. The method activates one of the first and second and third microphone units when the at least one sensor senses that the electronic device is angularly orientated within an angular range relative to a horizontal floor surface. The angular range comprises −30 degrees to 30 degrees relative to the floor surface. Further, the at least one sensor is a gyro sensor for sensing angular orientation of the electronic device and the electronic device is a portable terminal for communication.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Exemplary embodiments of the present invention are described herein with reference to the accompanying drawings. For the purposes of clarity and simplicity, well-known functions or constructions are not described in detail since they would obscure the invention in unnecessary detail. As used herein, a microphone device includes a plurality of microphone units disposed in an electronic device. Though it is not shown in FIGS. 1 to 7, each of the microphone units has microphones installed in the electronic device. The microphones may be fixed to bushings formed at an internal side of a case frame of the electronic device and be configured to electrically connect to a board of the electronic device.

Figure 1:
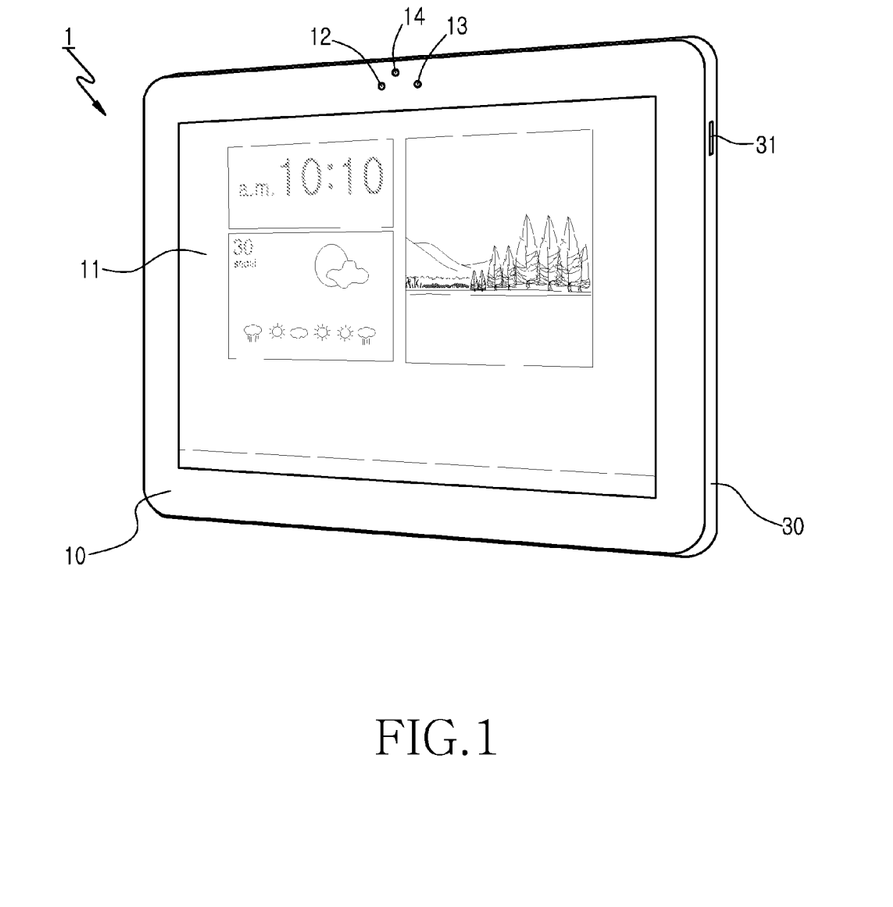
FIG. 1 shows a front perspective view of an electronic device according to invention principles.
Figure 2:
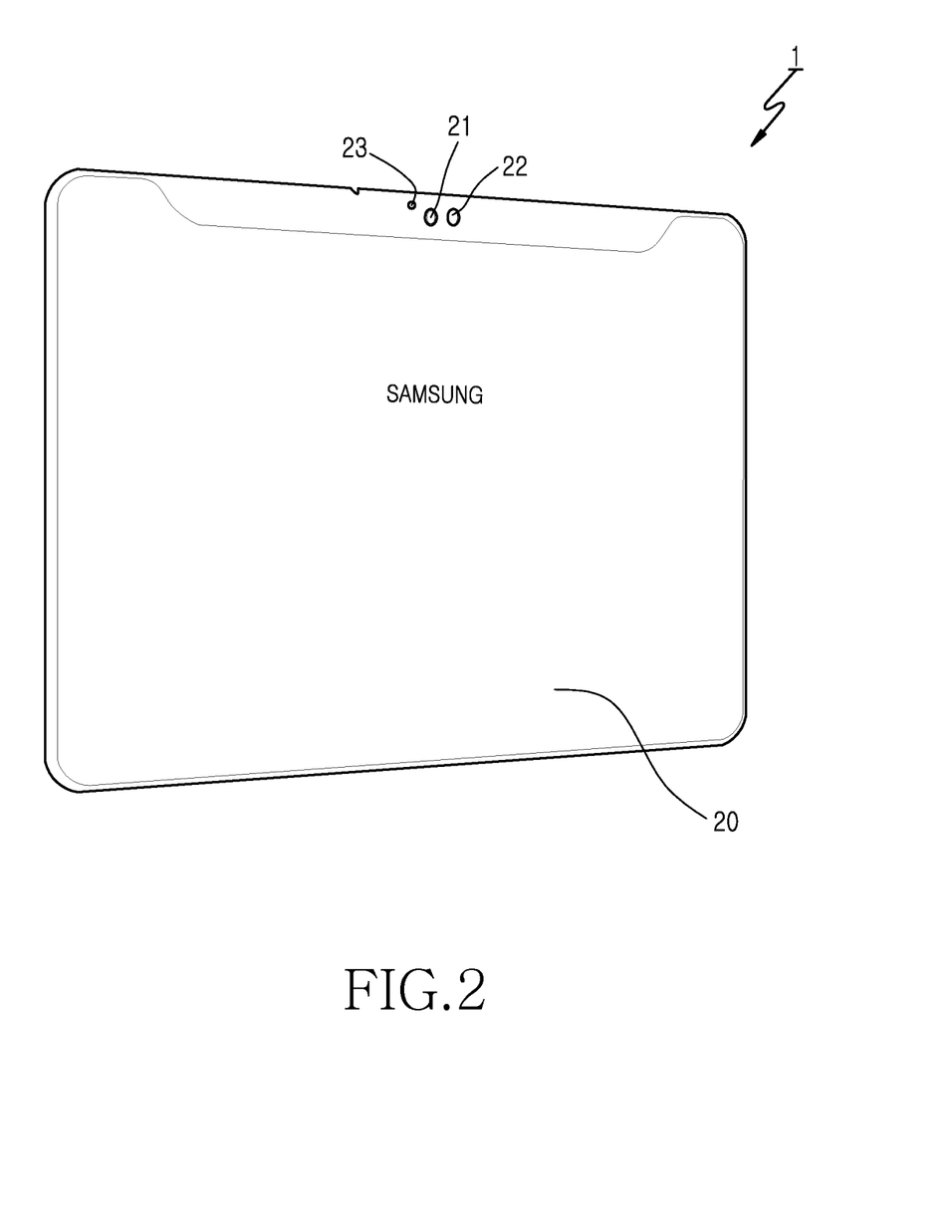
FIG. 2 shows a rear perspective view of an electronic device of FIG. 1 according to invention principles.
Figure 3:
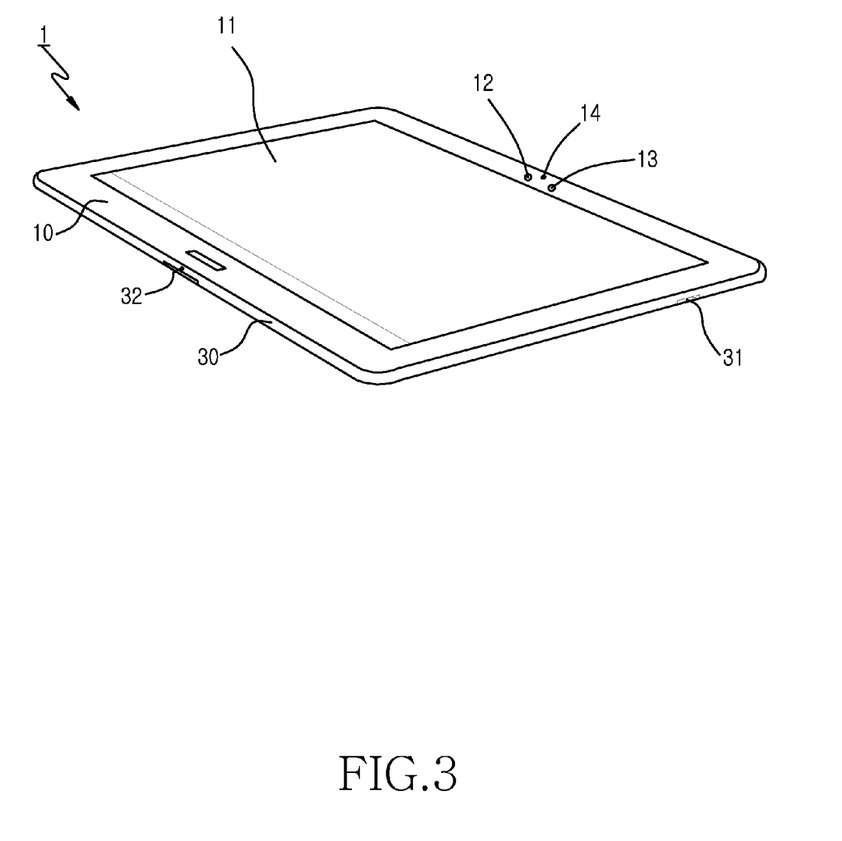
FIG. 3 shows a perspective view seen from another angle of an electronic device of FIG. 1 according to invention principles.

FIGS. 1 to 3 illustrate and describe, but are not limited to, a portable tablet terminal and the system may be also applied to different portable terminals involving a voice communication function or a speakerphone function. The electronic device 1 has a rectangular shape and includes a front side 10, a back side 20, and a lateral side 30. A display device 11 is installed in the front side 10 and a speaker device 31 is installed in the lateral side 30 to output multimedia objects. When a moving picture file or a music file, for example, are processed, music, voices and sounds are output. The speaker device 31 is installed in the lateral side 30 but may also be installed in the front side 10 or the back side 20. Unit 1 employs a touch screen in display device 11.

The electronic device maintains an optimal voice reception state and improves reliability of the electronic device by selectively operating a plurality of microphone units according to a condition (state or position) of the electronic device and an operation method thereof. An electronic device usage condition herein comprises at least one of, an operational state of microphones in the electronic device and a physical orientation (physical and angular position) relative to a plane (surface) such as a floor, table top, for example.

First, second and third microphone units 14, 23, and 32 comprising the microphone device are installed in different positions of the electronic device 1. The first microphone unit 14 is installed in an upper portion of the front side 10 of the electronic device 1 and the second microphone unit 23 is installed in an upper portion of the back side 20 of the electronic device. The first microphone unit 14 and the second microphone unit 23 are installed in positions where they physically overlap but may also not overlap in another embodiment and be separated by approximately 1 cm to 5 cm, for example.

The third microphone unit 32 is installed in the lateral side 30 of the electronic device 1 at a lower side substantially opposite to the position where the above-described first microphone unit 14 is installed. The first, second and third microphone units 12, 23, and 32 are installed behind microphone holes in a case frame of the electronic device 1.

Two microphone units of the first, second and third microphone units 12, 23, and 32 are selectively used in response to a first use condition of the electronic device 1. Specifically, the first and second microphone units 14 and 23 operate and the third microphone unit 32 does not operate under a normal (first) use condition of the electronic device 1. When the electronic device 1 is laid on a floor and maintains a horizontal state relative to a floor surface, the first, second and third microphone units 14, 23, and 32 are controlled such that just one of the first and second microphone units 14 and 32 operates and the third microphone unit 32 operates. In two of units 13, 23, and 32, one microphone unit operates as a main microphone unit to receive a voice of a user and another microphone unit operates as a sub-microphone unit to attenuate peripheral noise.

The electronic device 1 includes a sensor group 792 (see FIG. 7), including a plurality of sensors, for sensing a current use state. Sensors 792, such as proximity sensors 13 and 22 and camera sensors 12 and 21 which are installed in the front side 10 and the back side 20 of the electronic device 1, may be installed such that the user may check them visually. In addition to the proximity sensors 13 and 22 and the camera sensors 12 and 21, a gyro sensor (tilt sensor) 40 (see FIG. 6), an acceleration sensor and illumination sensors (not shown to preserve drawing clarity), for example, are installed in the electronic device 1 to sense a current use state (position) of the electronic device 1.

Therefore, the electronic device 1 combines sensing values of these sensors to sense a current use state and operate at least two microphone units providing the best performance of the first, second and third microphone units 14, 23, and 32 in response to the sensed current use state.

Figure 4:
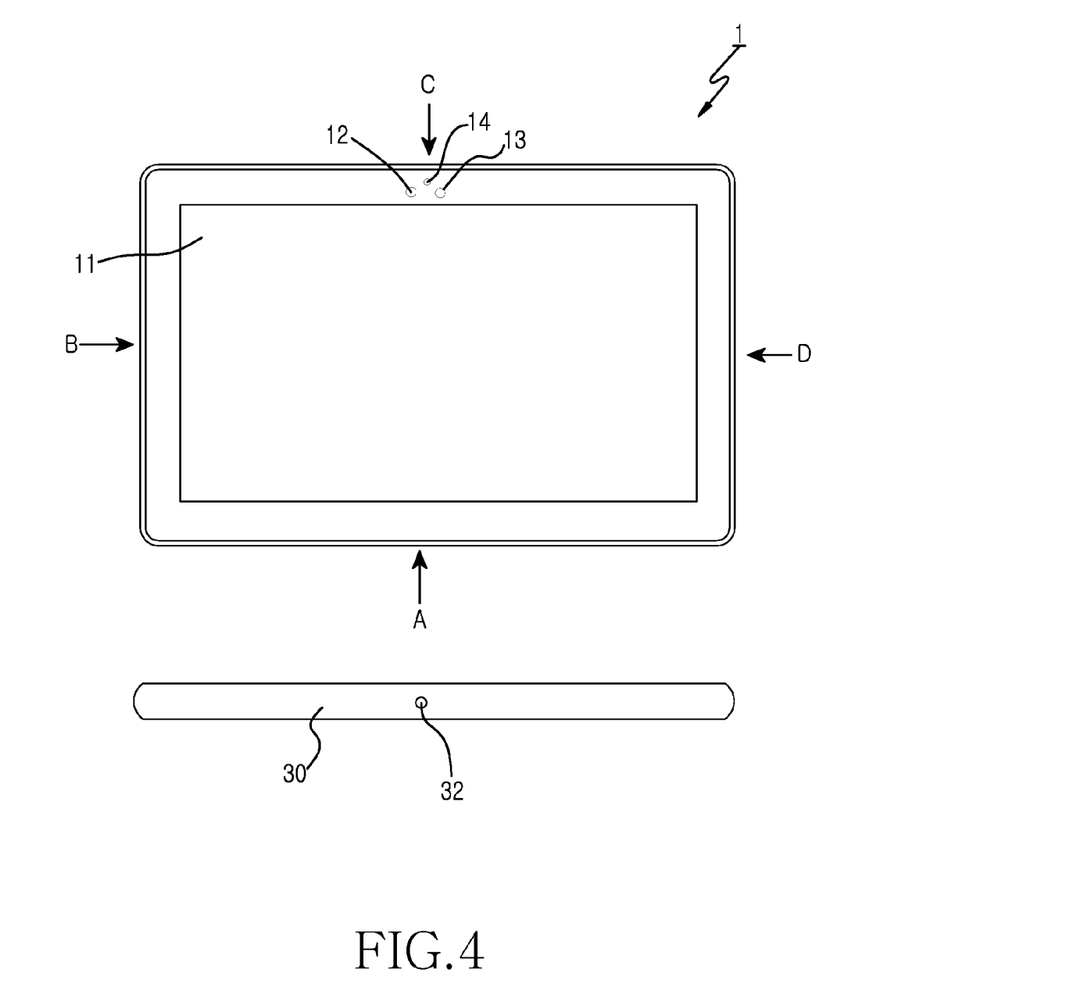
FIG. 4 shows an elevation view and a bottom plan view of an electronic device of FIG. 1 according to invention principles.

FIG. 4 shows an elevation view and a bottom plan view of the electronic device of FIG. 1. As shown in FIGS. 1, 2, and 4, the first and second microphone units 14 and 23 are installed in the front side 10 and the back side 20, respectively. The third microphone unit 32 is installed in the lateral side 30 of the electronic device 1. However, a plurality of additional microphone units may be further installed in the lateral sides and operate together with the first, second and third microphone units 14, 23, and 32. For example, as shown in FIG. 4, the third microphone unit 32 is installed in at the A portion of the electronic device 1 but may alternatively, or additionally, be installed in B, C, and D portions based on use and shape of the electronic device 1.

Also, the third microphone unit 32 installed in the lateral side 30 may be located in various portions based on shape of the lateral side 30 of the electronic device 1 and may be absent from front side 10 and back side 20. For example, when the lateral side is curved, the third microphone unit 32 may be located in a boundary portion between the front side 10 and the lateral side 30 or a boundary portion between the back side 20 and the lateral side 30 based on a determined position of a microphone hole for receiving a voice input. Although the third microphone unit 32 has a shape supporting juxtaposition with front side 10 and the lateral side 30 which are at right angles to each other or has a shape supporting juxtaposition with back side 20 and the lateral side 30 which are at right angles to each other, unit 32 may be formed in a boundary portion between the front side 10 and the lateral side 30 or a boundary portion between the back side 20 and the lateral side 30. Microphone unit 32 may be located at the front side and/or the back side 30 of the electronic device 1 spaced farthest apart from the first microphone unit 14 and/or the second microphone unit 23. For example, referring to FIG. 1, if the first microphone unit 14 is located at a central upper end portion of the front side 10 of the electronic device 1, in one embodiment the third microphone unit 32 is located at a central lower end portion of the front side 10 of the electronic device 1. However, the third microphone unit 32 may be located at various different positions.

Figure 5A:
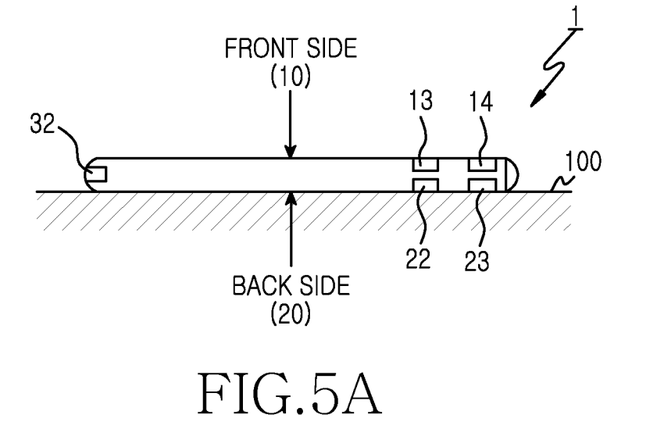
FIGS. 5A and 5B illustrate an operation state of a microphone device where the electronic device of FIG. 1 is laid on a floor according to invention principles.

FIGS. 5A and 5B illustrate an operation state of a microphone device where the electronic device of FIG. 1 is laid on a floor. As shown in FIGS. 1 and 5A, when the front side 10 of the electronic device 1 is laid on a floor surface (table, or other surface) 100 toward an upper direction and a second proximity sensor 22 senses that the back side 20 comes in contact with the floor surface 100. A processor operates the first microphone unit 14 as a main microphone unit and operates the third microphone unit 32 as a sub-microphone unit. Also, because the second microphone unit 23 is adjacent to the floor surface 100, the processor terminates operation of the second microphone unit 23.

Figure 5B:
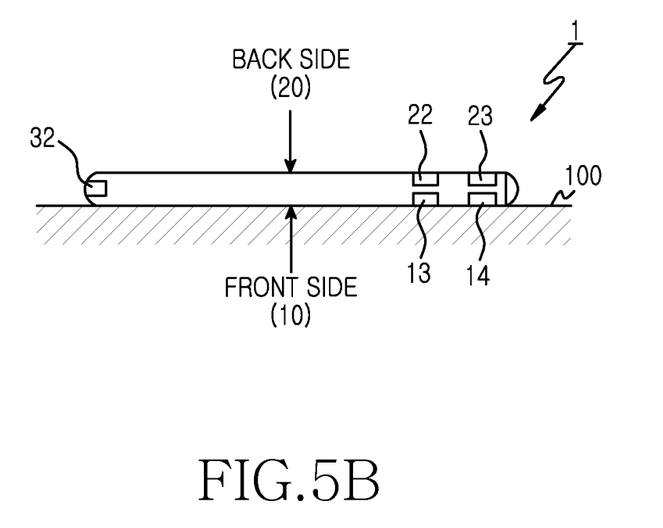

Also, as shown in FIGS. 1 and 5B, when the back side 20 of the electronic device 1 is laid on a floor surface 100, a first proximity sensor 13 senses that the front side 10 of the electronic device 1 comes in contact with the floor surface 100. In this case, a processor of the electronic device 1 operates the second microphone unit 23 as a main microphone unit and operates the third microphone unit 32 as a sub-microphone unit. Also, because the first microphone unit 14 is adjacent to the floor surface 100, the processor terminates operation of the first microphone unit 14. In the absence of first and second proximity sensors 13 and 22, contact with a floor surface is sensed using camera modules 12 and 21 installed in the front side 10 and the back side 20 of the electronic device 1.

Figure 6A:
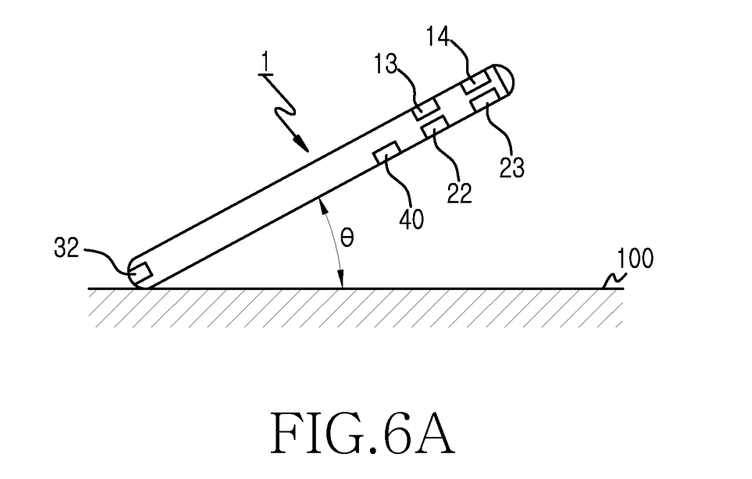
FIGS. 6A and 6B illustrate an operation state of a microphone device used the angled electronic device of FIG. 1 according to invention principles.
Figure 6B:
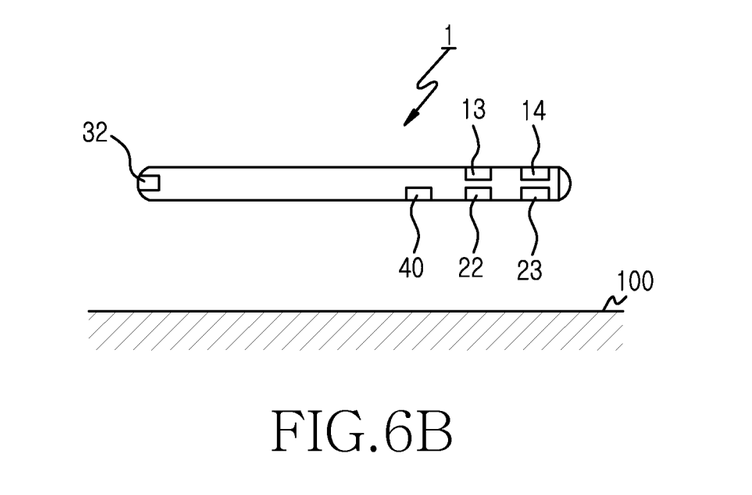

FIGS. 6A and 6B illustrate an operation state of a microphone device when the electronic device of FIG. 1 is at an angle. A processor senses that the electronic device 1 is at an angle from a floor surface although the electronic device 1 is spaced apart from the floor surface 100. For example, as shown in FIG. 6A, when the electronic device 1 operates in a state where it slants at a particular angle θ, a gyro sensor 40 of the electronic device 1 senses the particular angle θ and provides tilt information to the processor of the electronic device 1. In response to a determination by the processor that a slope θ exceeds a predetermined threshold angle, the processor activates the first microphone unit 14 and the second microphone unit 23 and inactivates the third microphone unit 32.

However, as shown in FIG. 6B, although the electronic device 1 is spaced apart from the floor surface 100 (the first and second proximity sensors 13 and 23 are not sensed in this state), the gyro sensor 40 senses that the electronic device 1 is in a substantially horizontal state and parallel to the floor surface 100. The processor operates the third microphone unit 32 instead of the second microphone unit 23 and activates the first microphone unit 14 and the third microphone unit 32 and inactivates the second microphone unit 23. The predetermined threshold angle may be set by a user. For example, when the gyro sensor 40 senses that the angle θ is in an range of 0 degree to 30 degrees, the processor of the electronic device 1 operates the third microphone unit 32 together with the first microphone unit 14, and inactivates the second microphone unit 23.

Also, as shown in FIG. 6A, when the gyro sensor 40 senses that the angle θ is 0 degrees or less, that is, when the electronic device 1 slants at an angle opposite to the angle θ shown in FIG. 6A, the processor of the electronic device 1 operates the second microphone unit 23 and the third microphone unit 32 instead of the first microphone unit 14 and activates the second microphone unit 23 and the third microphone unit 32 and inactivates the first microphone unit 14. The system prevents performance deterioration according to a use position of the electronic device 1 by sensing a use state of the electronic device 1 and selectively operating microphone units which offer the best reception operating conditions.

Figure 7:
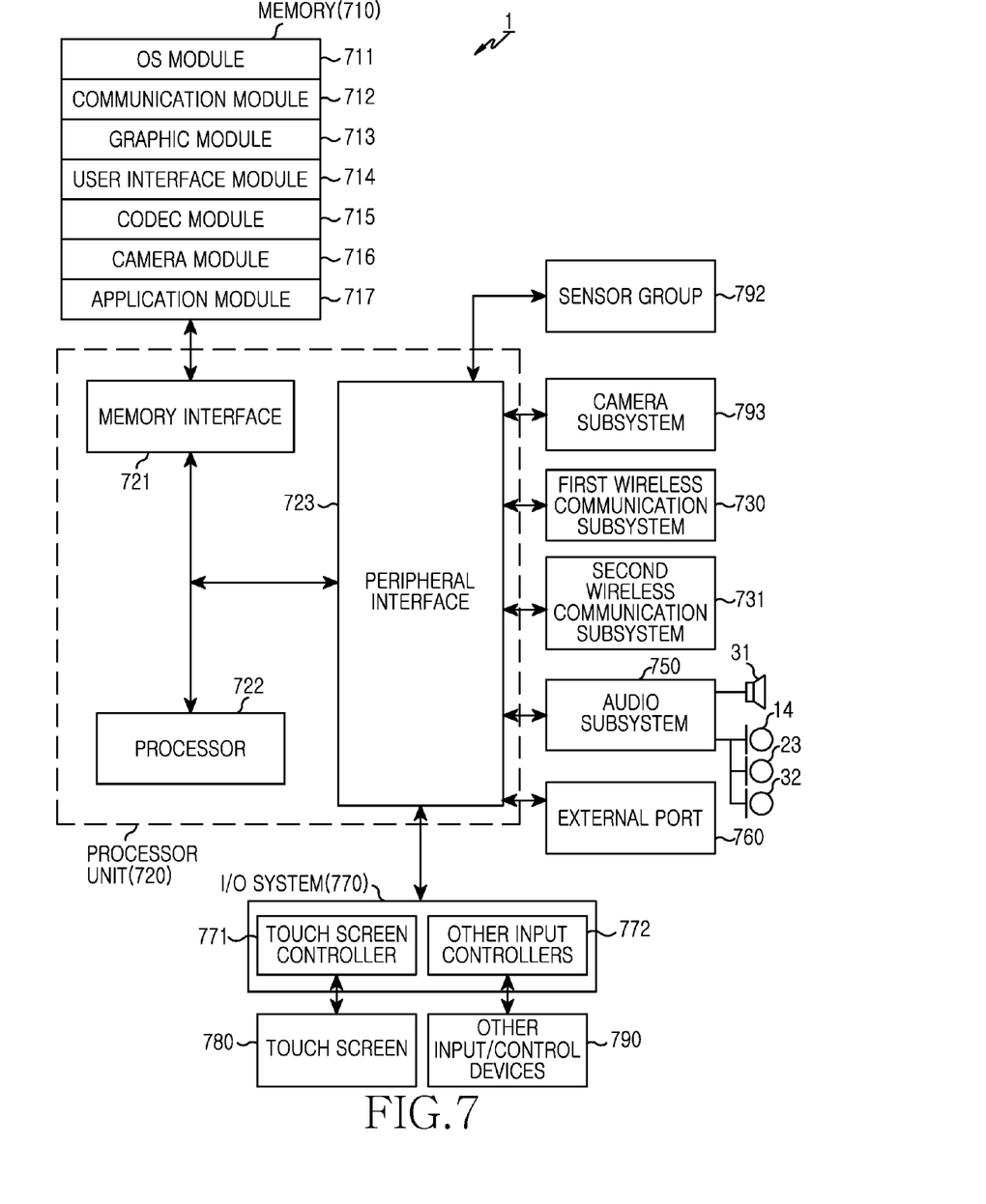
FIG. 7 shows a block diagram illustrating configuration of an electronic device of FIG. 1 according to invention principles.

FIG. 7 shows a block diagram illustrating configuration of an electronic device (e.g. a portable electronic device) of FIG. 1 including a plurality of microphone units for receiving external voices to perform a voice recognition function or a speakerphone function. The electronic device 1 comprises a portable terminal, a mobile phone, a mobile pad, a media player, a tablet computer, a handheld computer, and a Personal Digital Assistant (PDA), for example. Also, the electronic device 1 may be a particular portable electronic device including a device in which two or more functions of these devices are combined. Electronic device 1 includes a memory 710, a processor unit 720, a first wireless communication subsystem 730, a second wireless communication subsystem 731, an external port 760, an audio subsystem 750, a sensor group 792, a camera subsystem 793, a speaker 31, a microphone device including a plurality of microphone units 14, 23, and 32, an Input/Output (I/O) system 770, a touch screen 780, and other input/control devices 790. The memory 710 and the external port 760 may be a plurality of memories and external ports, respectively. The processor unit 720 includes a memory interface 721, one or more processors 722, and a peripheral interface 723. In some cases, the whole processor unit 720 is referred to as a processor.

The processor unit 720 may determines a current use state of the electronic device 1 according to the sensing of the sensor group 792 and selectively operates the microphone units to provide an optimal operating state for microphone units 14, 23, and 32 in response to the sensed state. The processor 722 executes multiple software programs and performs multiple functions for the electronic device 1. Also, the processor 722 performs process and control for voice communication and data communication and in addition, the processor 722 executes a specific software module (instruction set) stored in the memory 710 and performs multiple specific functions corresponding to the software module. That is, the processor 722 interoperates with the software modules stored in the memory 710 and performs the methods described herein.

The processor 722 may include one or more data processors, an image processor, or a codec and may include multiple processors for performing different functions. The peripheral interface 723 connects the I/O system 770 of the electronic device 1 and multiple peripherals to the processor 722 and the memory 710 (though the memory interface 721). Different components of the electronic device 1 may be coupled by one or more communication buses or communication channels. The external port 760 is used to connect a portable electronic device (not shown) to another electronic device directly or connect it to another electronic device indirectly through a network (e.g., the Internet, an intranet, a wireless Local Area Network (LAN), etc.). For example, the external port 760 means, but is not limited to, a Universal Serial Bus (USB) port, a firewire port. The sensor group 792 includes known sensors such as first and second proximity sensors which are installed in a front side and a back side of the electronic device 1, a gyro sensor which may sense a current slope of the electronic device 1, for example. Further, in addition to the known sensors, a position measurement system and other sensors such as a temperature sensor and a bio-sensor may connect to the peripheral interface 723 and perform related functions.

The camera subsystem 793 performs a camera function like a photo acquisition and video clip recording function. A communication function is performed through the first and second wireless communication subsystems 730 and 731. Each of the first and second wireless communication subsystems 730 and 731 may include a radio frequency receiver and transceiver and/or a beam (e.g., infrared ray) receiver and transceiver. The first communication subsystem 730 and the second communication subsystem 731 may be classified according to a communication network through which the electronic device 1 communicates. For example, the communication network may be, but is not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, or/and a Bluetooth network. Each of the first and second communication subsystems 730 and 731 may include a communication subsystem designed to be operated through the communication network. The first and second wireless communication subsystems 730 and 731 may be combined and configured as one wireless communication subsystem.

The audio subsystem 750 connects to the speaker 31 and the microphone units 14, 23, and 32, and are responsible for inputting and outputting an audio stream, and support a voice recognition function, a voice copy function, a digital recording function, and a phone call function. That is, the audio subsystem 750 communicates with a user through the speaker 31 and the microphone units 14, 23, and 32. The audio subsystem 750 receives a data stream through the peripheral interface 723 of the processor unit 720 and converts the received data stream into an electronic data stream. The converted electronic data stream is transmitted to the speaker 31. The audio subsystem 750 converts the received electronic data stream into an audio data stream and transmits the converted audio data stream to the peripheral interface 723. The audio subsystem 750 may include an attachable and detachable ear microphone.

The I/O system 770 includes a touch screen controller 771 and/or other input controllers 772. The touch screen controller 771 is coupled to the touch screen 780. The touch screen 780 and the touch screen controller 771 detect contact and motion using capacitive, resistive, infrared ray, and surface acoustic wave technologies for determining one or more contact points with the touch screen 780 and may also comprise a multi-touch sensing technology including other proximity sensor arrangements or other elements. The other input controllers 772 are coupled to the other input/control devices 790. The other input/control devices 790 comprise pointer devices such as one or more buttons, a rocket switch, a thumbwheel, a dial, a stick, and/or a stylus, for example.

The touch screen 780 provides an input/output interface between the electronic device 1 and the user. That is, the touch screen 780 transmits touch input of the user to the electronic device 1. Also, the touch screen 780 is a medium for displaying output from the electronic device 1 to the user and displays visual output to the user comprising text, a graphics, video, and a combination thereof. The touch screen 780 may be any one of multiple displays. For example, the touch screen 780 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The memory 710 may be coupled to the memory interface 721. The memory 710 may include a high-speed Random Access Memory (RAM) such as one or more magnetic storages, a non-volatile memory, one or more optical storages, and/or a flash memory (e.g., a NAND flash memory or a NOR flash memory). The memory 710 stores software components. The software components include an Operating System (OS) module 711, a communication module 712, a graphic module 713, a user interface module 714, a CODEC module 715, a camera module 716 and one or more application modules 717, for example. Also, the modules which comprise software components are expressed in a set of instructions comprising programs.

The OS module 711 (e.g., an embedded OS such as Windows, Linux, Darwin, RTXC, UNIX, OS X, or VxWorks) includes multiple software components for controlling a general system operation. For example, control of this general system operation means memory management and control, storage hardware (device) control and management, power control and management, etc. This OS module 711 also performs a function for smoothly communicating between multiple hardware components (devices) and software components (modules). The communication module 712 communicates with other electronic devices such as a computer, a server, and/or a portable terminal through the first and second wireless communication subsystems 730 and 731 or the external port 760. The graphic module 713 includes multiple software components for providing and displaying graphics on the touch screen 780. The term "graphics" means that texts, web pages, icons, digital images, videos, animations, etc. are included. The user interface module 714 includes multiple software components related to a user interface. The user interface module 714 includes contents identifying whether a state of a user interface is changed to another state, whether a state of a user interface is changed in any condition, for example.

The CODEC module 715 may include software components related to encoding and decoding of video files. The CODEC module 715 may include a video stream module such as an MPEG module and/or an H204 module. Also, the CODEC module 715 may include a code module for multiple audio files such as AAA files, AMR files, and WMA files. The camera module 716 includes cameral-related software components which may perform camera-related processes and functions. The application module 717 includes a browser function, an email function, an instant message function, a word processing function, a keyboard emulation function, an address book function, a touch list function, a widget function, a Digital Right Management (DRM) function, a voice recognition function, a voice copy function, a position determining function, a location based service function, for example. A variety of functions of the electronic device 1, are executed by processor hardware including an Application Specific Integrated Circuit (ASIC) in response to code and software programs.

The electronic device 1 enhances reliability of a device by operating a plurality of microphone units according to a use condition thereof, optimally removing peripheral noise, and receiving an accurate voice signal.

While the present invention has been particularly shown and described with reference to exemplary embodiments thereof, it are understood by those skilled in the art that various changes in form and details may be made therein without departing from the spirit and scope of the present invention as defined by the appended claims.

The above-described embodiments can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. An electronic device, comprising:
    a first microphone unit installed in a front side of the electronic device;
    a second microphone unit installed in a back side of the electronic device;
    a third microphone unit installed at a position within the electronic device;
    at least one sensor installed in the electronic device, for sensing a usage condition of the electronic device; and
    a processor for selectively activating at least two of the first, second and third microphone units in response to the sensed usage condition of the electronic device,
    wherein the electronic device is a portable terminal for performing a communication function, and
    wherein the usage condition indicates at least one of an angle between the electronic device and a floor surface, and whether a side of the electronic device comes in contact with the floor surface.

2. The electronic device of claim 1, wherein the third microphone unit is located at a lateral side of the electronic device.

3. The electronic device of claim 1, wherein the third microphone unit is located at a boundary portion between the front side and a lateral side of the electronic device.

4. The electronic device of claim 1, wherein the third microphone unit is located at a boundary portion between the back side and a lateral side of the electronic device.

5. The electronic device of claim 1, wherein the at least one sensor comprises proximity sensors which are installed in the front side and the back side of the electronic device, respectively, for sensing whether the front side or the back side comes in contact with the floor surface.

6. The electronic device of claim 1, wherein the at least one sensor comprises camera modules which are installed in the front side and the back side of the electronic device, respectively, for sensing whether the front side or the back side comes in contact with the floor surface.

7. The electronic device of claim 1, wherein the at least one sensor comprises illumination sensors, which are installed in the front side and the back side of the electronic device, respectively, for sensing whether the front side or the back side comes in contact with the floor surface.

8. The electronic device of claim 1, wherein the at least one sensor comprises at least one of, a gyro sensor and an acceleration sensor, which are installed in the electronic device, for sensing the angle.

9. The electronic device of claim 1, wherein the processor inactivates at least one of the first and second microphone units located at the side of the electronic device which comes in contact with the floor surface in response to the at least one sensor sensing that the electronic device resides on the floor surface.

10. The electronic device of claim 1, wherein the processor activates at least one of the first and second microphone units and the third microphone unit when the at least one sensor senses that the electronic device is orientated at an angular range relative to the floor surface.

11. The electronic device of claim 10, wherein the angular range is a range where the electronic device has an angle of −30 degrees to 30 degrees relative to the floor surface.

12. The electronic device of claim 1, wherein the first microphone unit is located at a front upper end portion of the electronic device and wherein the second microphone unit is located at the back side of a portion where it is overlapped with the first microphone unit or a portion adjacent to an overlapped position.

13. The electronic device of claim 12, wherein the second microphone unit is located within an overlap region comprising a range of 1 cm to 5 cm from a center of the first microphone unit in the back side of the electronic device.

14. An operation method of an electronic device, the operation method comprising:
    determining a current usage condition of the electronic device comprising a physical orientation of the electronic device relative to a surface in response to sensing by at least one sensor installed in the electronic device; and selectively activating two of first, second and third microphone units and inactivating the remaining microphone unit of the first, second and third microphone units, in response to the determined usage condition, wherein the first, second and third microphone units are located at front, back, and lateral sides of the electronic device, wherein the electronic device is a portable terminal for performing a communication function, and wherein the usage condition indicates at least one of an angle between the electronic device and a floor surface, and whether a side of the electronic device comes in contact with the floor surface.

15. The operation method of claim 14, further comprising inactivating at least one of the first, second and third microphone units, which is installed in the side of the electronic device facing the floor surface when the at least one sensor senses that the electronic device is laid on the floor surface.

16. The operation method of claim 15, wherein the at least one sensor comprises at least one of proximity sensors, illumination sensors, and camera modules, which sense that the electronic device is laid on the floor surface.

17. The operation method of claim 14, further comprising activating one of the first and second and third microphone units when the at least one sensor senses that the electronic device is orientated within an angular range relative to the floor surface.

18. The operation method of claim 17, wherein the angular range comprises −30 degrees to 30 degrees relative to the floor surface.

19. The operation method of claim 14, wherein the at least one sensor is a gyro sensor for sensing the angle.

* * * * *